(12) United States Patent
Reeves et al.

(10) Patent No.: US 10,511,990 B1
(45) Date of Patent: Dec. 17, 2019

(54) WIRELESS RELAY BACKHAUL OVER VISITOR WIRELESS USER DEVICES

(71) Applicant: Sprint Communications Company L.P., Overland Park, KS (US)

(72) Inventors: Raymond Emilio Reeves, Oviedo, FL (US); Dwight Devan Inman, Travelers Rest, SC (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

(21) Appl. No.: 15/461,307

(22) Filed: Mar. 16, 2017

(51) Int. Cl.
    *H04W 28/02*     (2009.01)
    *H04W 40/22*     (2009.01)
    *H04W 92/18*     (2009.01)

(52) U.S. Cl.
    CPC ....... *H04W 28/0231* (2013.01); *H04W 40/22* (2013.01); *H04W 92/18* (2013.01)

(58) Field of Classification Search
    CPC .. H04W 28/0231; H04W 40/22; H04W 92/18
    USPC ................................................ 370/229, 235
    See application file for complete search history.

(56) References Cited

U.S. PATENT DOCUMENTS

| | | | |
|---|---|---|---|
| 5,479,400 A | 12/1995 | Dilworth et al. | |
| 8,248,949 B2 | 8/2012 | Ozer et al. | |
| 8,520,559 B2 | 8/2013 | Rao et al. | |
| 8,855,072 B2 | 10/2014 | Moon et al. | |
| 9,125,133 B2 | 9/2015 | Ji et al. | |
| 9,338,082 B2 | 5/2016 | Liu et al. | |
| 2007/0030809 A1 | 2/2007 | Dayama | |
| 2009/0029645 A1 | 1/2009 | Leroudier | |
| 2009/0285133 A1 | 11/2009 | Rao et al. | |
| 2011/0170526 A1 | 7/2011 | Hsieh et al. | |
| 2012/0002537 A1* | 1/2012 | Bao ........................ | H04W 24/04 370/221 |
| 2013/0336195 A1 | 12/2013 | Seo et al. | |
| 2014/0254471 A1* | 9/2014 | Fang ................... | H04W 84/047 370/315 |
| 2016/0150577 A1 | 5/2016 | Fan et al. | |
| 2017/0265187 A1* | 9/2017 | Chen ..................... | H04W 76/14 |

* cited by examiner

*Primary Examiner* — Obaidul Huq (57) ABSTRACT

A wireless relay uses multiple wireless backhaul options. In the relay, a wireless access point exchanges user data with wireless user devices including a visitor device. The wireless access point exchanges the user data with Relay Equipment (RE) in the wireless relay. The RE exchanges the user data with a home wireless communication network. The RE detects a loss of performance for the home wireless communication network, and initiates a backhaul connection through the visitor wireless user device and a visitor wireless communication network. The wireless access point exchanges additional user data with the wireless user devices. The wireless access point exchanges the additional user data with the RE. The RE exchanges the additional user data with the home wireless communication network over the backhaul connection through the visitor wireless user device and the visitor wireless communication network.

18 Claims, 6 Drawing Sheets

WIRELESS RELAY BACKHAUL OVER VISITOR WIRELESS USER DEVICES

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Wireless communication networks are deployed to extend the range and mobility of these data communication services.

The typical wireless communication network has several macro-cell base stations that provide radio coverage over large urban areas. The macro-cell base stations may still not be able to cover every part of the urban area with enough capacity. Outside of the urban areas, the macro-cell base stations may be too large for environments like inter-state highways and smaller towns. Wireless relays are deployed to alleviate these problems.

A wireless relay has a wireless access point to wirelessly communicate with user devices. The wireless relay also has wireless Relay Equipment (RE) to wirelessly communicate with macro-cell base stations or other wireless relays. Thus, the macro-cell base stations serve both user devices and wireless relays. The wireless relays serve both user devices and wireless relays. The REs in the wireless relays form wireless backhaul connections to wireless communication networks.

Unfortunately, the wireless backhaul connections may suffer from various problems like loss-of-signal, excessive RF noise or interference, low-bandwidth, large latencies, and the like. The REs in the wireless relays do not effectively and efficiently implement alternative wireless backhaul. In particular, the REs do not effectively and efficiently use the wireless user devices to implement wireless backhaul.

TECHNICAL OVERVIEW

A wireless relay uses multiple wireless backhaul options. In the relay, a wireless access point exchanges user data with wireless user devices including a visitor device. The wireless access point exchanges the user data with Relay Equipment (RE) in the wireless relay. The RE exchanges the user data with a home wireless communication network. The RE detects a loss of performance for the home wireless communication network, and initiates a backhaul connection through the visitor wireless user device and a visitor wireless communication network. The wireless access point exchanges additional user data with the wireless user devices. The wireless access point exchanges the additional user data with the RE. The RE exchanges the additional user data with the home wireless communication network over the backhaul connection through the visitor wireless user device and the visitor wireless communication network.

DETAILED DESCRIPTION

Figure 1:
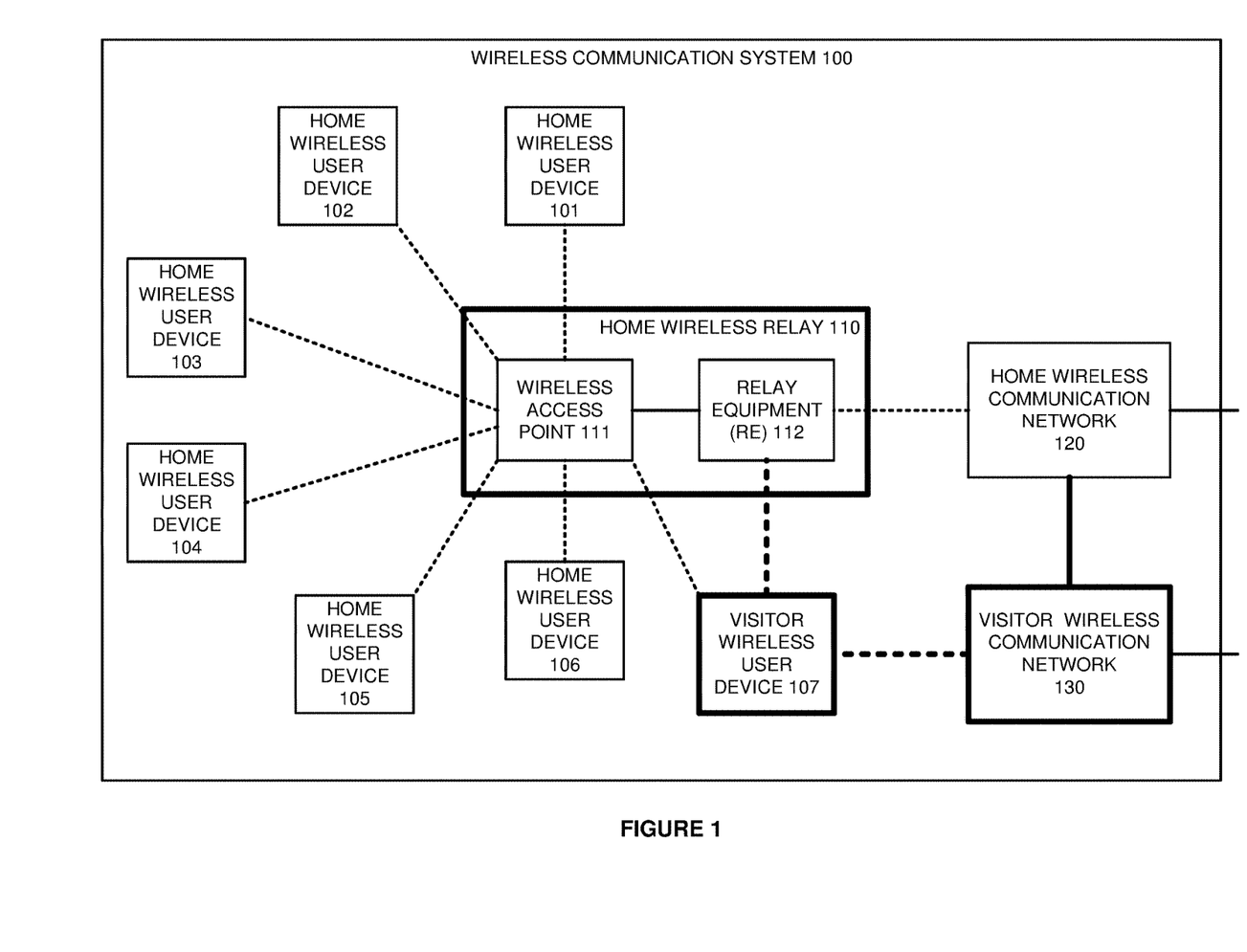
FIGS. 1-2 illustrate wireless communication system 100 with wireless relay 110 that uses multiple wireless backhaul options.
Figure 2:
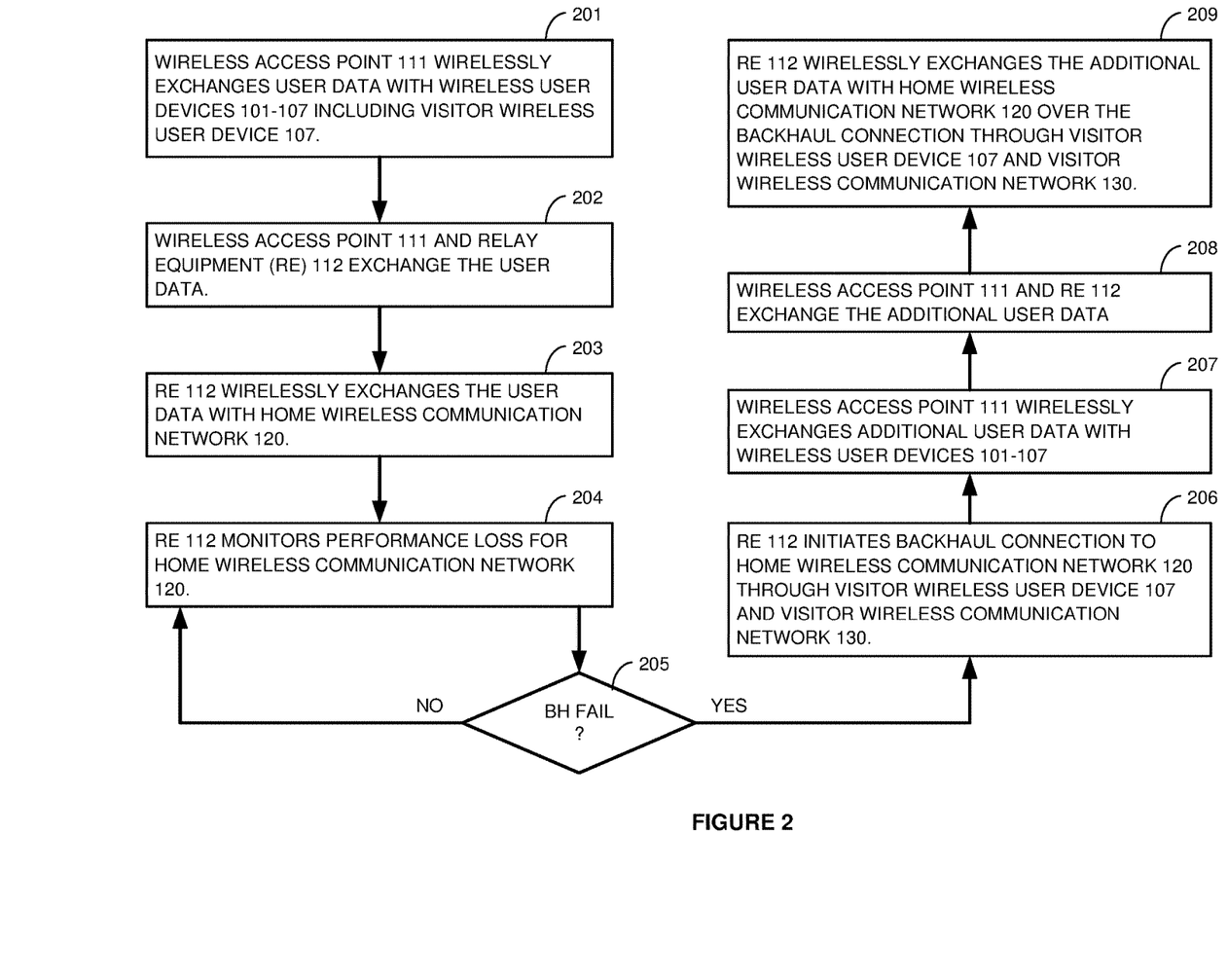

FIGS. 1-2 illustrate wireless communication system 100 with wireless relay 110 that uses multiple wireless backhaul options. Wireless communication system 100 exchanges user data for wireless user devices 101-107. Wireless user devices 101-107 comprise computers, phones, or some other intelligent machines with Radio Frequency (RF) communication components. The user data exchanges support data services such as content streaming, media conferencing, machine communications, internet access, or some other computerized information service.

Referring to FIG. 1, wireless communication system 100 comprises home wireless user devices 101-106, visitor wireless user device 107, home wireless relay 110, home wireless communication network 120, and visitor wireless communication network 130. Home wireless relay 110 comprises wireless access point 111 and Relay Equipment (RE) 112.

Wireless access point 111 is made of computer hardware like Central Processing Units (CPUs), Random Access Memory (RAM), persistent data storage, bus interfaces, and data transceivers. The data communication transceivers include antennas, amplifiers, filters, and digital signal processors for wireless data communication. Wireless access point 111 also has computer software like operating systems, baseband applications, user access applications, and networking applications. In some examples, wireless access point 111 comprises a Long Term Evolution (LTE) eNodeB.

RE 112 is made of computer hardware like CPUs, RAM, persistent data storage, bus interfaces, and data transceivers. The data communication transceivers include antennas, amplifiers, filters, and digital signal processors for wireless data communication. RE 112 also has computer software like operating systems, access interface applications, and networking applications. Wireless communication networks 120 and 130 comprise network elements like wireless access points, data gateways, data links, network controllers, and authorization databases. In some examples, RE 112 comprises LTE User Equipment (UE) adapted to serve its co-located wireless access point, such as an eNodeB.

Home wireless communication network 120 maintains an authentication and authorization database for its home users including wireless user devices 101-106. During wireless attachment, home wireless communication network 120 uses the database to authenticate and authorize wireless user devices 101-106 to obtain wireless data services. Likewise, visitor wireless communication network 130 maintains an authentication and authorization database for its own users including visitor wireless user device 107. During wireless attachment, visitor wireless communication network 120 uses the database to authenticate and authorize visitor wireless user device 107 to obtain wireless data services.

When visitor wireless user device 107 attaches to wireless access point 111 in home wireless relay 110, then home wireless communication network 120 signals visitor wireless communication network 130 to authenticate and authorize visitor wireless user device 107. Typically, home wireless communication network 120 and visitor wireless communication network 130 will broadcast different Network Identifiers (NIDs) and/or Public Land Mobile Network Identifiers (PLMN IDs) from one another to attract their own user devices. In this example, visitor wireless user device 107 visits and attaches to home wireless relay 110—perhaps to obtain better wireless data service or a unique wireless data service.

In operation, wireless access point 111 wirelessly exchanges user data with home wireless user devices 101-106 and with visitor wireless user device 107. Wireless access point 111 and RE 112 exchange the user data. RE 112 wirelessly exchanges the user data with home wireless communication network 120. Home wireless communication network 120 exchanges the user data with external systems.

RE 112 monitors the performance of home wireless communication network 120. When RE 112 detects a loss of performance for home wireless communication network 120, then RE 112 initiates a backhaul connection to home wireless communication network through visitor wireless user device 107 and visitor wireless communication network 130. The loss of performance could a loss-of-signal, unacceptable data rate, excessive error rate, or some other wireless data service inhibitor. The backhaul initiation could be an instruction from RE 112 to wireless access point 111 to interact with visitor wireless user device 107 and establish a data link between RE 112 and visitor wireless user device 107. For example, wireless access point 111 may instruct visitor wireless user device 107 to enable wireless fidelity service for RE 112 and transfer the Service Set Identifier (SSID) and password for visitor wireless user device 107 to RE 112.

Wireless access point 111 wirelessly exchanges additional user data with wireless user devices 101-107. Wireless access point 111 and RE 112 exchange the additional user data. RE 112 and home wireless communication network 120 exchange the additional user data over the backhaul connection through visitor wireless user device 107 and visitor wireless communication network 130.

In some examples, visitor wireless user device 107 registers with home wireless communication network 120 as a backhaul device. Home wireless communication network 120 then notifies RE 112 that visitor wireless user device 107 may be used as a backhaul device. Wireless access point 111 may receive the registration and notify RE 112 of the backhaul option through visitor wireless user device 107. Alternatively, a Mobility Management Entity (MME) or Internet Protocol Multimedia Subsystem (IMS) may receive the registration and notify RE 112 of the backhaul option through visitor wireless user device 107.

Referring to FIG. 2, the operation of wireless relay 110 to use multiple wireless backhaul options is described. In wireless relay 110, wireless access point 111 and wireless user devices 101-107 wirelessly exchange user data (201). Wireless access point 111 and RE 112 exchange the user data (202). RE 112 wirelessly exchanges the user data with home wireless communication network 120 (203). Home wireless communication network 120 exchanges the user data with external systems.

RE 112 monitors the performance of home wireless communication network 120 (204). The loss of performance could a loss-of-signal, unacceptable data rate, excessive error rate, or some other wireless data service inhibitor. When RE 112 detects backhaul failure due to a loss of performance in home wireless communication network 120 (205), RE 112 initiates a backhaul connection to home wireless communication network 120 through visitor wireless user device 107 and visitor wireless communication network 130 (206).

Wireless access point 111 and wireless user devices 101-107 wirelessly exchange additional user data (207). Wireless access point 111 and RE 112 exchange the additional user data (208). RE 112 and home wireless communication network 120 exchange the additional user data over the backhaul connection through visitor wireless user device 107 and visitor wireless communication network 130 (209).

Figure 3:
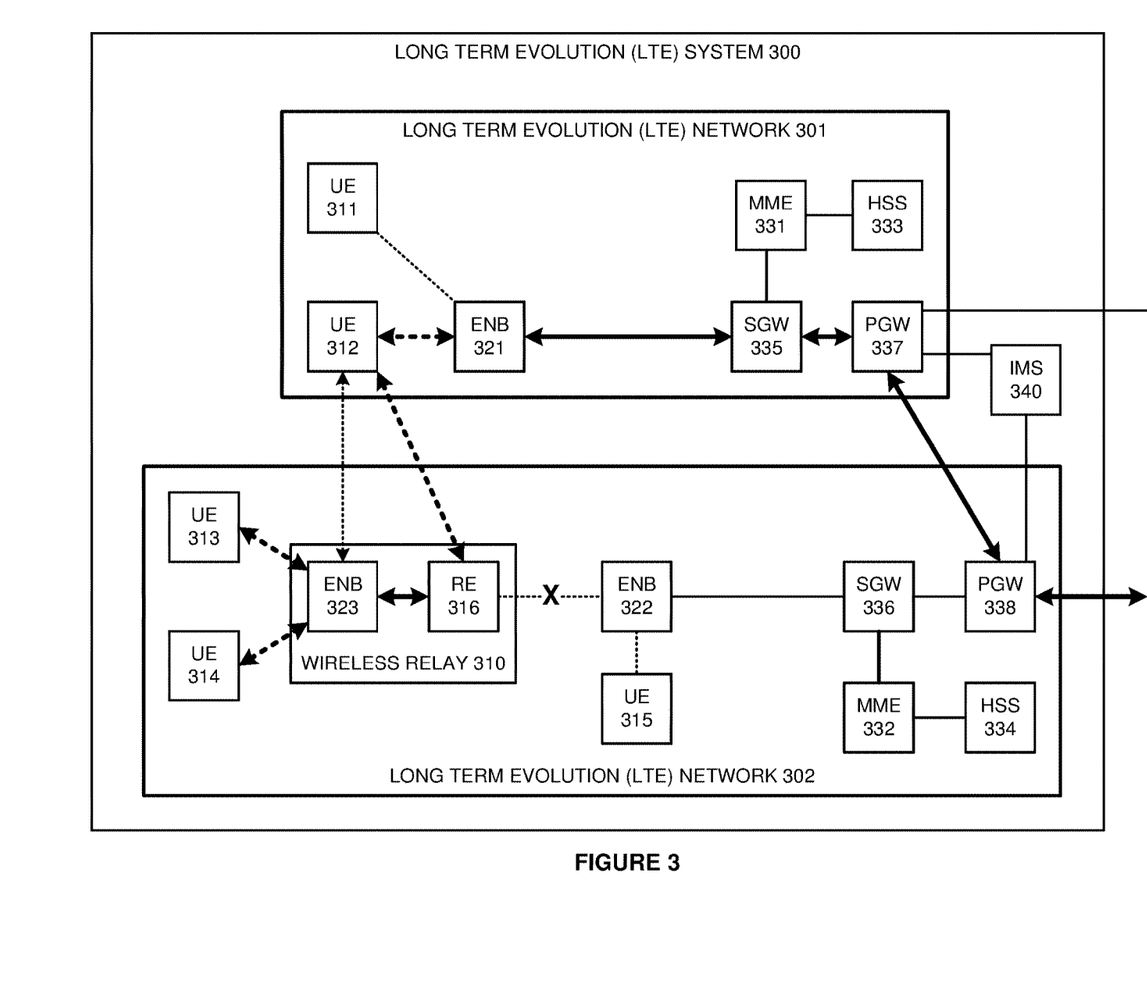
FIG. 3 illustrates Long Term Evolution (LTE) system 300 with wireless relay 310 that uses multiple wireless backhaul options.

FIG. 3 illustrates Long Term Evolution (LTE) system 300 with wireless relay 310 that uses multiple wireless backhaul options. LTE system 300 comprises LTE networks 301-302 and Internet Protocol Multimedia Subsystem (IMS) 340. LTE network 301 comprises User Equipment (UEs) 311-312, evolved Node B (ENB) 321, Mobility Management Entity (MME) 331, Home Subscriber System (HSS) 333, Serving Gateway (SGW) 335, and Packet Data Network Gateway (PGW) 337. LTE network 302 comprises UEs 313-315, wireless relay 310, ENBs 322-323, MME 332, HSS 334, SGW 336, and PGW 338. Wireless relay 310 comprises ENB 323 and Relay Equipment (RE) 316. RE 316 may be a UE adapted to serve ENB 323.

LTE networks 301-302 broadcast different Network Identifiers (NIDs) and Public Land Mobile Network Identifiers (PLMN IDs) from one another. The broadcast NID and PLMN for LTE network 101 attracts UE 311. When UE 311 attaches to ENB 321, MME 331 dips HSS 333 to authenticate and authorize UE 311 to use LTE network 301. Likewise, the broadcast NID and PLMN for LTE network 102 attracts UEs 313-315. When UE 313-315 attach to ENBs 321 and 323, MME 332 dips HSS 334 to authenticate and authorize UEs 313-315 to use LTE network 302.

UE 312 does not initially attach to its home LTE network 301. Due to a better signal or service, UE 312 attaches to ENB 323 in wireless relay 310. When visitor UE 312 attaches to ENB 323, MME 332 signals MME 331 to dip HSS 333 to authenticate and authorize UE 312 to use LTE network 302.

UE 312 then registers with MME 332 as a backhaul device over its Non-Access Stratum (NAS) link. MME 332 notifies RE 316 that UE 312 is a backhaul device over the NAS to RE 316. Alternatively, UE 312 may register with ENB 323 as a backhaul device over its Radio Resource Control (RRC) link, and ENB 323 notifies RE 316 that UE 312 is a backhaul device over an Ethernet link. In another alternative, UE 312 may register with IMS 340 as a backhaul device over its Session Initiation Protocol (SIP) link, and IMS 340 notifies RE 316 that UE 312 is a backhaul device over another SIP link.

UEs 312-314 wirelessly exchange user data with ENB 323. ENB 323 and RE 316 exchange the user data over an Ethernet link. RE 316 wirelessly exchanges the user data with ENB 322. ENB 322 and SGW 336 exchange the user data. SGW 336 and PGW 338 exchange the user data. PGW 338 exchanges the user data with external systems. Likewise, UE 311 wirelessly exchanges user data with ENB 321. ENB 321 and SGW 335 exchange the user data. SGW 335 and PGW 337 exchange the user data. PGW 337 exchanges the user data with external systems.

RE 316 monitors the performance of the wireless link to ENB 322. When RE 316 detects a loss of performance from ENB 322 (indicated on the figure by an X), then RE 316 initiates a backhaul connection through LTE network 301 to LTE network 302. To initiate the backhaul option, RE 316 instructs ENB 323 to signal UE 312 to enable wireless fidelity service for RE 316. UE 312 attaches to ENB 321, and MME 331 authenticates and authorizes UE 312 using HSS 333. UE 312 enables its wireless fidelity service.

ENB 323 obtains the Service Set Identifier (SSID) and password for UE 312 and transfers the SSID and password to RE 316. RE 316 attaches to UE 312 and obtains network access. RE 316 then registers with PGW 338 in LTE network 302 over LTE network 301. An enhanced Packet Data Gateway (ePDG) may be used for the registration and interface between PGWs 337-338.

In wireless relay 310, ENB 323 and UEs 313-314 now exchange additional user data. ENB 323 and RE 316 exchange the additional user data. RE 316 and UE 312 exchange the additional user data over the alternative backhaul option. UE 312 and ENB 321 exchange the additional user data over the alternative backhaul option. ENB 321 and SGW 335 exchange the additional user data over the alternative backhaul option. SGW 335 and PGW 337 exchange the additional user data over the alternative backhaul option. PGW 337 and PGW 338 exchange the additional user data over the alternative backhaul option—typically through an ePDG. PGW 338 exchanges the additional user data with the external systems.

Figure 4:
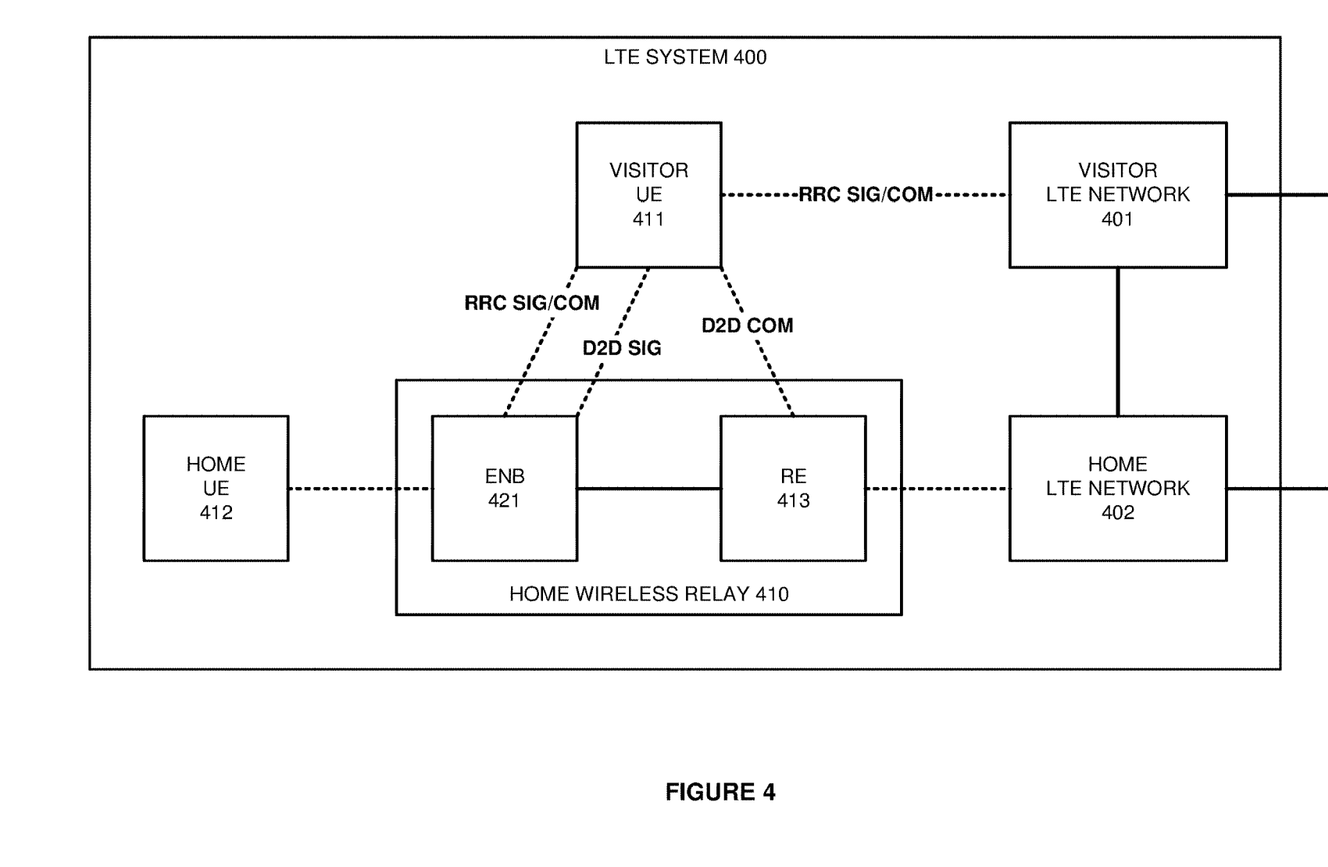
FIG. 4 illustrates LTE system 400 with wireless relay 410 that uses wireless Device-to-Device (D2D) backhaul.

FIG. 4 illustrates Long Term Evolution (LTE) system 400 with wireless relay 410 that uses a wireless Device-to-Device (D2D) backhaul option. LTE system 400 comprises visitor LTE network 401, home LTE network 402, home wireless relay 410, visitor UE 411, and home UE 412. LTE networks 401-402 broadcast different NIDs and PLMN IDs. Home UE 412 attaches to ENB 421 in wireless relay 410. Visitor UE 411 does not initially attach to its home network (visitor LTE network 401), but instead, visitor UE 411 attaches to ENB 421 in wireless relay 410 over an RRC link to carry user signaling (SIG) and communications (COM).

UEs 411-412 wirelessly exchange user data with ENB 421. ENB 421 and RE 413 exchange the user data over an Ethernet link. RE 413 wirelessly exchanges the user data with home LTE network 402 which exchanges the user data with external systems. RE 413 monitors the performance of home LTE network 402. When RE 413 detects a loss of performance from LTE network 402, RE 413 initiates a backhaul connection through visitor UE 411 and visitor LTE network 401.

To initiate the backhaul option, RE 413 instructs ENB 421 to instruct establish a D2D link between visitor UE 411 and RE 413. ENB directs visitor UE 411 to establish the D2D link and to attach to visitor LTE network 401. Thus, visitor UE 411 is capable of dual LTE sessions with different LTE networks. ENB 421 schedules the D2D LTE link between visitor UE 411 and RE 413. RE 413 then registers with LTE network 402 over LTE network 401.

ENB 421 and UE 412 now exchange additional user data. ENB 421 and RE 413 exchange the additional user data. RE 413 and visitor UE 411 exchange the additional user data over the D2D backhaul link. Visitor UE 411 and visitor LTE network 401 exchange the additional user data. Visitor LTE network 401 and home LTE network 402 exchange the additional user data. Home LTE network 402 exchanges the additional user data with the external systems.

Figure 5:
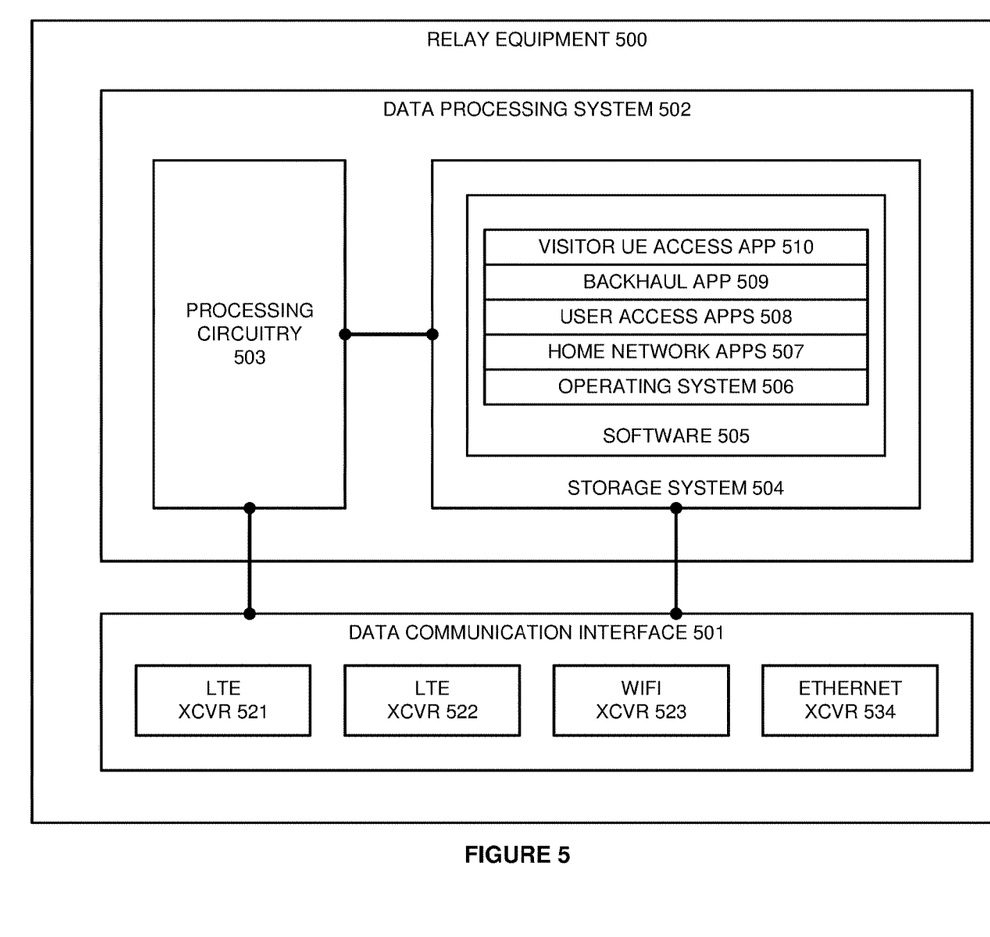
FIG. 5 illustrates Relay Equipment (RE) 500 to use multiple wireless backhaul options.

FIG. 5 illustrates Relay Equipment (RE) 500 to use multiple wireless backhaul options. RE 500 is an example of the REs described above, although this equipment may use alternative configurations and operations. Relay equipment 500 comprises data communication interface 501 and data processing system 502. Data communication interface 501 comprises Long Term Evolution (LTE) transceivers 521-522, Wireless fidelity (WIFI) transceiver 523, and Ethernet transceiver 524. Data processing system 502 comprises processing circuitry 503 and storage system 504. Storage system 504 stores software 505. Software 505 includes respective software modules 506-510.

LTE transceivers 521-522 and WIFI transceiver 523 comprises communication components, such as antennas, amplifiers, filters, modulators, signal processors, ports, bus interfaces, memory, software, and the like. Ethernet transceiver 524 comprises communication components, such as ports, bus interfaces, signal processors, memory, software, and the like. Processing circuitry 503 comprises server blades, circuit boards, bus interfaces, CPUs, integrated circuitry, and associated electronics. Storage system 504 comprises non-transitory, machine-readable, data storage media, such as flash drives, disc drives, memory circuitry, servers, and the like. Software 505 comprises machine-readable instructions that control the operation of processing circuitry 503 when executed.

Relay equipment 500 may be centralized or distributed. All or portions of software 506-510 may be externally stored on one or more storage media, such as circuitry, discs, and the like. Some conventional aspects of relay equipment 500 are omitted for clarity, such as power supplies, enclosures, and the like. When executed by processing circuitry 503, software modules 506-510 direct circuitry 503 to perform the following operations.

Operating system 506 interfaces between software modules 507-510 and the relay equipment hardware (processing circuitry 503, data communication interface 501, RAM, storage). Home network applications (APPS) 507 control network RF protocols for home network access. User access applications 508 interact with the co-located wireless access point to serve user devices. Backhaul application 509 monitors home network performance and initiates alternative backhaul options. Visitor UE access app 510 uses the visitor UEs for the optional backhaul connections.

Figure 6:
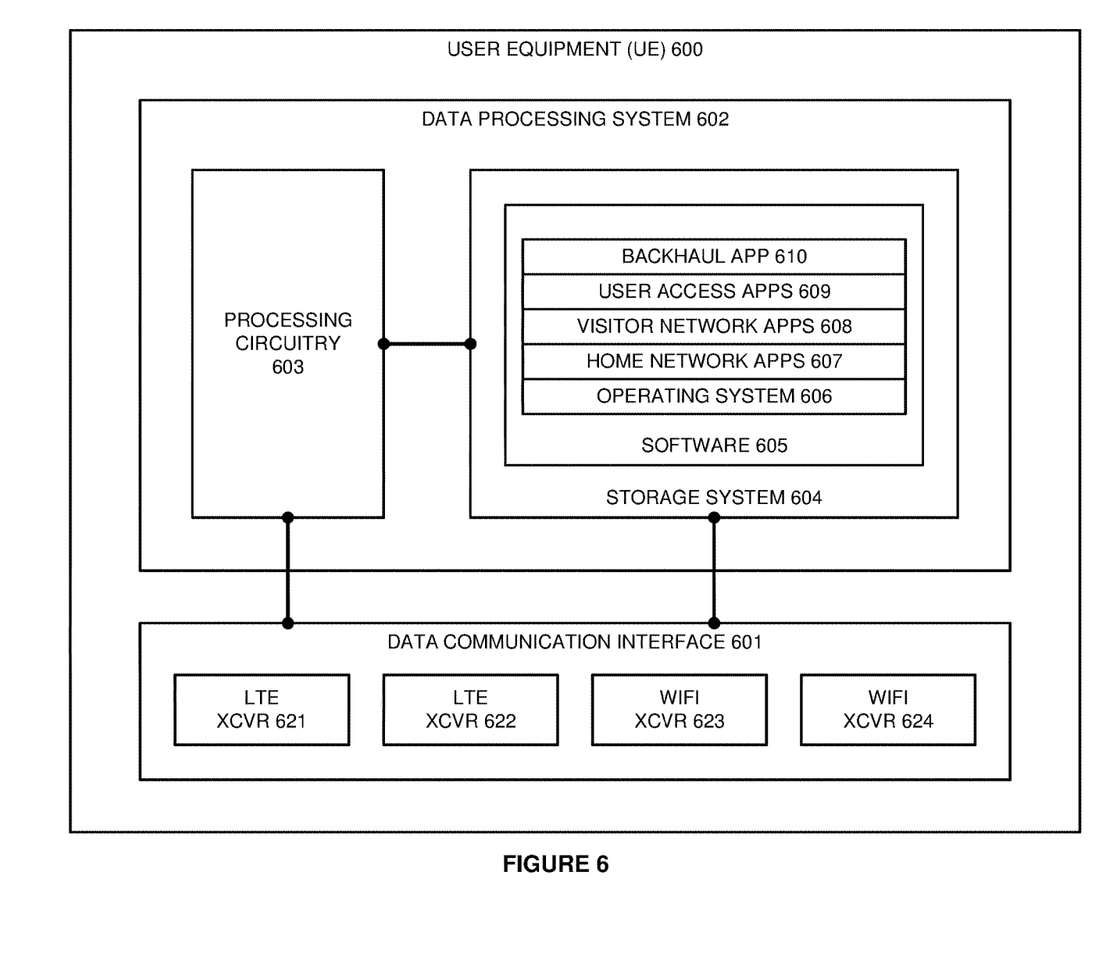
FIG. 6 illustrates User Equipment (UE) 600 to serve a wireless relay with a wireless backhaul option.

FIG. 6 illustrates User Equipment (UE) 600 to serve a wireless relay with a wireless backhaul option. UE 600 is an example of the UEs described above, although this equipment may use alternative configurations and operations. UE 600 comprises data communication interface 601 and data processing system 602. Data communication interface 601 comprises LTE transceivers 621-622, WIFI transceiver 623, and Ethernet transceiver 624. Data processing system 602 comprises processing circuitry 603 and storage system 604. Storage system 604 stores software 605. Software 605 includes respective software modules 606-610.

LTE transceivers 621-622 and WIFI transceiver 623 comprises communication components, such as antennas, amplifiers, filters, modulators, signal processors, ports, bus interfaces, memory, software, and the like. Ethernet transceiver 624 comprises communication components, such as ports, bus interfaces, signal processors, memory, software, and the like. Processing circuitry 603 comprises server blades, circuit boards, bus interfaces, CPUs, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed.

UE 600 may be centralized or distributed. All or portions of software 606-610 may be externally stored on one or more storage media, such as circuitry, discs, and the like. Some conventional aspects of UE 600 are omitted for clarity, such as power supplies, enclosures, and the like. When executed by processing circuitry 603, software modules 606-610 direct circuitry 603 to perform the following operations.

Operating system 606 interfaces between software modules 607-610 and the UE hardware (processing circuitry 603, data communication interface 601, RAM, storage). Home network applications (APPS) 607 control network RF protocols for home network access. Visitor network applications 608 control network RF protocols for visited network access. User access applications 609 serve user devices including REs with wireless service. Backhaul application 610 initiates and uses backhaul options for the REs in the wireless relays.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless relay to use multiple wireless backhaul options, the method comprising:
   a wireless access point wirelessly exchanging user data with wireless user devices including a visitor wireless user device;
   the wireless access point and Relay Equipment (RE) exchanging the user data;
   the RE wirelessly exchanging the user data with a home wireless communication network;
   the RE detecting a loss of performance for the home wireless communication network;
   the wireless access point initiating and scheduling a wireless Device-to-Device (D2D) link between the RE and the visitor wireless user device and wirelessly exchanging additional user data with the wireless user devices;
   the wireless access point and the RE exchanging the additional user data; and
   the RE wirelessly exchanging the additional user data with the home wireless communication network over the wireless D2D link to the visitor wireless user device and the visitor wireless communication network.

2. The method of claim 1 wherein the home wireless communication network and the visitor wireless communication network broadcast different Public Land Mobile Network identifiers.

3. The method of claim 1 wherein the home wireless communication network and the visitor wireless communication network broadcast different Network Identifiers (NIDs).

4. The method of claim 1 wherein the wireless access point comprises a Long Term Evolution (LTE) eNodeB.

5. The method of claim 1 wherein the visitor wireless user device registers with the home wireless communication network as a backhaul device and the home wireless communication network responsively notifies the RE that the visitor wireless user device comprises a backhaul device.

6. The method of claim 1 wherein the visitor wireless user device registers with the wireless access point as a backhaul device and the wireless access point responsively notifies the RE that the visitor wireless user device comprises a backhaul device.

7. The method of claim 1 wherein the visitor wireless user device registers with a Mobility Management Entity (MME) as a backhaul device and the MME responsively notifies the RE that the visitor wireless user device comprises a backhaul device.

8. The method of claim 1 wherein the visitor wireless user device registers with an Internet Protocol Multimedia Subsystem (IMS) as a backhaul device and the IMS responsively notifies the RE that the visitor wireless user device comprises a backhaul device.

9. The method of claim 1 further comprising
   the RE establishing a wireless fidelity link to the visitor wireless user device; and
   the RE exchanging the additional user data over the wireless fidelity link to the visitor wireless user device.

10. A wireless relay to use multiple wireless backhaul options comprising:
    a wireless access point configured to wirelessly exchange user data with wireless user devices including a visitor wireless user device and exchange the user data with Relay Equipment (RE);
    the RE configured to exchange the user data with a home wireless communication network and detect a loss of performance for the home wireless communication network;
    the wireless access point configured to initiate and schedule a wireless Device-to-Device (D2D) link between the RE and the visitor wireless user device and wirelessly exchange additional user data with the wireless user devices and the RE; and
    the RE configured to exchange the additional user data with the home wireless communication network over the wireless D2D link to the visitor wireless user device and the visitor wireless communication network.

11. The wireless relay of claim 10 wherein the home wireless communication network and the visitor wireless communication network broadcast different Public Land Mobile Network identifiers.

12. The wireless relay of claim 10 wherein the home wireless communication network and the visitor wireless communication network broadcast different Network Identifiers (NIDs).

13. The wireless relay of claim 10 wherein the wireless access point comprises a Long Term Evolution (LTE) eNodeB.

14. The wireless relay of claim 10 wherein the visitor wireless user device registers with the home wireless communication network as a backhaul device and the home wireless communication network responsively notifies the RE that the visitor wireless user device comprises a backhaul device.

15. The wireless relay of claim 10 wherein the visitor wireless user device registers with the wireless access point as a backhaul device and the wireless access point responsively notifies the RE that the visitor wireless user device comprises a backhaul device.

16. The wireless relay of claim 10 wherein the visitor wireless user device registers with a Mobility Management Entity (MME) as a backhaul device and the MME responsively notifies the RE that the visitor wireless user device comprises a backhaul device.

17. The wireless relay of claim 10 wherein the visitor wireless user device registers with an Internet Protocol Multimedia Subsystem (IMS) as a backhaul device and the IMS responsively notifies the RE that the visitor wireless user device comprises a backhaul device.

18. The wireless relay of claim 10 wherein the RE is further configured to establish a wireless fidelity link to the visitor wireless user device and exchange the additional user data over the wireless fidelity link to the visitor wireless user device.

\* \* \* \* \*